US006251968B1

(12) United States Patent
Schledjewski et al.

(10) Patent No.: US 6,251,968 B1
(45) Date of Patent: Jun. 26, 2001

(54) METHOD FOR MODIFYING PRODUCTS OR HALF-STUFFS FROM MOLDING MATERIALS CONSISTING OF MIXTURES OF THERMOPLASTIC SYNTHETIC MATERIALS

(75) Inventors: Ralf Schledjewski, Hodenhagen; Dirk Schultze, Düsseldorf; Gunter Weber, Fallingbostel; Rainhard Koch, Köln, all of (DE)

(73) Assignee: Wolfe Walsrode AG, Walsrode (DE)

( * ) Notice: Subject to any disclaimer, the term of this patent is extended or adjusted under 35 U.S.C. 154(b) by 0 days.

(21) Appl. No.: 09/367,534

(22) PCT Filed: Feb. 4, 1998

(86) PCT No.: PCT/EP98/00586

§ 371 Date: Aug. 16, 1999

§ 102(e) Date: Aug. 16, 1999

(87) PCT Pub. No.: WO98/36019

PCT Pub. Date: Aug. 20, 1998

(30) Foreign Application Priority Data

Feb. 17, 1997 (DE) ............................................. 197 06 024

(51) Int. Cl.⁷ .................................................... H01M 2/00
(52) U.S. Cl. ........................................... 523/124; 524/538
(58) Field of Search ............................... 524/538; 523/124

(56) References Cited

U.S. PATENT DOCUMENTS 5,852,114 * 12/1998 Loomis et al. .......................... 525/57

FOREIGN PATENT DOCUMENTS 19619236    11/1997  (DE) .

OTHER PUBLICATIONS

Chemical Abstracts, vol. 121, No. Jul. 11, 1994, Abstract No. 10314 & JP 05344897 (Amano Pharma Co. Ltd.).
Patent Abstracts of Japan vol. 003, No. 142, Nov. 24, 1979 & JP 54 119593.

* cited by examiner

Primary Examiner—Edward J. Cain
(74) Attorney, Agent, or Firm—Joseph C. Gil; James R. Franks

(57) ABSTRACT

The present invention relates to a method for modifying articles and/or semi-finished products made from polymer resin moulding compositions, wherein said articles and/or semi-finished products, which substantially consist of moulding compositions comprising mixtures of thermoplastic polymers where exhibit good biodegradability and thermoplastic polymers which exhibit poor biodegradability, are subjected to biodegradation.

11 Claims, No Drawings

METHOD FOR MODIFYING PRODUCTS OR HALF-STUFFS FROM MOLDING MATERIALS CONSISTING OF MIXTURES OF THERMOPLASTIC SYNTHETIC MATERIALS

This invention relates to a method of modifying products and/or semi-finished products made from multi-phase moulding compositions. The latter are preferably synthesised from mixtures of thermoplastics. The methods according to the invention are characterised by a modification of the specific gravity and/or surface structure by the selective biodegradation of one or more of the polymer resins which are used for the production thereof. The moulding compositions are obtained using mixtures comprising thermoplastic materials which exhibit good biodegradability and those which exhibit poor biodegradability or which do not exhibit biodegradability. The methods of modification according to the invention are superior to the methods which are known in the prior art for dissolving out defined components.

Methods are known in the prior art for the modification of polymers or polymer surfaces by the selective leaching-out of individual phases by solvents which exhibit a particular affinity for said individual phases. Surfaces to which a matt finish has been imparted can be produced by this mode of treatment, for example.

It is also known that certain phases can be dissolved out by suitable etching processes. In this method, for example, morphologies can be produced which have proved useful in electrochemical coating processes.

Moreover, in multi-phase plastics systems which contain phases of different elasticities it is known that a change in surface properties or in the properties of the matrix can be obtained by deliberate (over)stretching, optionally in a plurality of directions.

Modified matrix properties are advantageous, for example, if porous membrane structures are to be produced which in the optimum case possess a defined pore structure.

Modified surface properties are expected of colostomy aids, for example, which nowadays also have to exhibit biodegradability, at least in part. They also have to adapt to bodily movements in a flexible, elastic manner. Soft coverings of high flexibility which are kind to the skin are required for this purpose. They must exhibit a good feel, which is also termed "touch". In particular, the coverings which are known from the prior art are obtained nowadays by the welding of preforms of anatomical shape, which can be produced by thermoforming. Thicker, thermoplastically deformable films are required for this purpose which do not exhibit the unpleasant feel of a comparatively smooth, glossy film which is typical of plastics.

The object of the present invention was thus to achieve an agreeable feel by means of modifications to the surface of the film. In particular, the object was to improve the matt character of plastics articles and was also to influence the properties of the matrix in a targeted manner.

It has surprisingly proved possible, using the method of the type described at the outset, to achieve modifications to the surface- or matrix properties of products or semi-finished products made from thermoplastic moulding compositions containing multi-phase plastics mixtures.

It was not obvious to the relevant person skilled in the art with previous experience in this field that articles and/or semi-finished products which are modified by the method according to the invention would have a pleasant feel whilst at the same time possessing an acceptable level of mechanical properties.

Methods according to the invention which are particularly suitable for modifying articles and/or semi-finished products made from polymer resin moulding compositions are characterised in that partial biodegradation occurs under uniform and defined ambient conditions with regard to temperature, pH and ambient medium.

The methods according to the invention are based on the degradation, at least in part, of at least one phase of plastics articles which are made from multi-phase plastics mixtures. Biodegradable thermoplastic resins have proved useful as a formulation component here.

Moulding compositions comprising mixtures of thermoplastic resins can be produced by methods which are known from the prior art.

Polymer mixtures, blends or cuts can be produced by the mechanical mixing of melts, latices or solutions of two separately produced polymer resins, or by the in-situ polymerisation of monomers in the presence of a polymer resin which has been formed previously.

This is advantageously effected by mixing two separately produced polymer resins in the molten state. For this purpose, polymer resins which usually exist in the form of compacted form, granules or powders are mixed in kneaders or in extruders. The thermoplastic polymer resins which are suitable according to the invention are heated above their glass transition or melting temperatures in the course of this procedure. Good mixing throughout is achieved at elevated temperatures and/or under high shearing stresses.

A procedure which is preferred according to the invention is the modification of products and/or semi-finished products made from polymer compounds which have been produced prior to the forming operation. For this purpose, the polymer resins which are used for the thermoforming operation are subjected beforehand to a premixing operation in a softened state in a compounding step. The compounding devices which are known in the art are suitable devices for a mixing step such as this. Devices which have proved useful are those which comprise a plurality of endless screws, particularly the twin endless screw kneaders which are favoured for compounding operations.

A procedure which has also proved to be advantageous is the production of products and/or semi-finished products by a method comprising the premixing, in an unsoftened state, of the raw materials for the moulding composition. Premixing here is effected before the thermal digestion of the moulding composition raw materials.

Customary thermal forming methods for the processing of plastics are particularly suitable for the production of products/semi-finished products which are suitable for modification according to the invention.

Appropriate methods of modifying plastics articles are particularly suitable according to the invention if said articles comprise a proportion of at least 30% by weight of a thermoplastic resin which exhibits good biodegradability and a proportion of at least 15% by weight of a thermoplastic resin which exhibits biodegradability which is less good.

Biodegradable plastics are particularly preferred as components of the thermoplastic formulation.

The biodegradability of biodegradable resins, resin mixtures or films is defined in accordance with DIN 54 900 (draft version of 1996).

Biodegradable resins which are particularly appropriate according to the invention for the formulation of suitable moulding compositions are those from the group comprising ester amide copolymer resins.

Suitable thermoplastic ester amide copolymers for the mixtures according to the invention are preferably formed from predominantly linear, thermoplastic ester amide copolymers which contain A) an ester constituent formed from linear and/or cycloaliphatic bifunctional alcohols, for example from ethylene glycol, hexanediol or butanediol, preferably butanediol or cyclohexanedimethanol, and optionally from small amounts of alcohols of higher functionality in addition, for example 1,2,3-propanetriol or neopentyl glycol, and from linear and/or cycloaliphatic bifunctional acids, for example succinic acid, adipic acid or cyclohexanedicarboxylic acid, preferably adipic acid, and optionally small amounts of acids of higher functionality in addition, for example trimellitic acid, or B) an ester constituent formed from acid- and alcohol-functionalised components. for example hydroxybutyric acid or hydroxyvaleric acid, or derivatives thereof, for example ε-caprolactone, or a mixture or a copolymer of A) and B) as an ester constituent, and C) an amide constituent formed from linear and/or cycloaliphatic bifunctional amines and optionally from small amounts of amines of higher functionality in addition, for example tetramethylenediamine, hexamethylenediamine or isophorone-diamine, and from linear and/or cycloaliphatic bifunctional acids, for example succinic acid or adipic acid, or D) an amide constituent formed from acid- and amine-functionalised components, preferably ω-laurolactam, and most preferably ε-caprolactam, or a mixture of C) and D) as an amide constituent, wherein the proportion of ester constituent A) and/or B) is at least 30% by weight with respect to the sum of A), B), C) and D).

These biodegradable, compostable polyester amides preferably have a molecular weight of at least 10,000 g/mol and comprise a random distribution of the starting materials (monomers) in the polymer.

Typical properties of moulding compositions produced from copolymer resins based on ester amide systems are described in detail, for example, in the information on the application technology of biodegradable plastics which is available from BAYER AG.

The preferred methods of modifying plastics articles are characterised in that partial biodegradation of the plastics articles is effected by the use of bacteria. This process can be conducted in liquid systems, such as solutions which contain microorganisms for example, preferably in nutrient solutions, or in solid systems, such as in soil and/or preferably in compost, for example. If degradation is effected in liquid systems, pure cultures of microorganisms which decompose plastics can be added.

Methods which are also preferred for the modification of plastics articles are characterised in that partial biodegradation of the plastics articles is effected enzymatically in a buffer solution.

The aim has been to produce moulding compositions which are as soft as possible and which have a pleasant feel, and which exhibit good biodegradability. This aim also includes inexpensive production or processing operations.

Since the biodegradation of non-crystalline phases preferably occurs in the course of the method according to the invention, embrittlement of the products and/or semi-finished products cannot be ruled out.

Methods which are preferred according to the invention are those which are characterised in that the Shore D hardness of the moulding composition before modification, as measured according to DIN 53 505, is less than 55.

The object of the invention is most preferably achieved by the production of soft, flexible moulding compositions by mixing thermoplastic polyurethanes with polyester amide copolymer resins. The thermoplastic polyurethanes are built up from soft and hard segments, whereby it is possible to obtain a moulding composition which exhibits permanent softness. Moulding compositions are therefore preferred which contain at least one thermoplastic component which is modified so that it becomes permanently soft and which exhibits an lesser degree of biodegradability.

Thermoplastic polyurethanes have long been known and exhibit a high level of chemical resistance. Their three basic components are diisocyanates, short chain diols—which are also termed chain extenders—and long chain diols, wherein the latter contribute to the properties of softness and flexibility. Instead of using diols only, small proportions of polyols are sometimes added also, in order to effect partial mutual crosslinking of the molecular chains, which would otherwise be linear. The extensive choice of raw materials for each of the three aforementioned groups of starting materials forms the basis for a diverse range of possibilities for the chemical synthesis of thermoplastic polyurethanes and thus for varying the properties thereof.

In general, a combination of good strength values, i.e. tensile strength and resistance to tear propagation, and a high degree of elasticity, i.e. a high level of extensibility and cold flexibility, is aimed at for commercially available thermoplastic polyurethanes. A review of the chemical synthesis, production and properties of thermoplastic polyurethanes, and of the possibilities of use which result therefrom, is given, for example, by Goyert and Hespe in Kunststoffe 68 (1978) 819–825, and by Hepburn (Ed.) in Polyurethane Elastomers, Applied Science Publishers, Barking 1982.

Suitable thermoplastic polyurethane elastomers for the mixtures according to the invention preferably comprise what are predominantly linear thermoplastic polyurethane elastomers, the long chain diol component of which is formed from polyesters or polyethers, and which preferably have a Shore hardness of 75–95 A, most preferably 85–92 A, as determined according to DIN 53 505.

Suitable thermoplastic polyurethanes can be obtained, for example, under the trade names Desmopan, Elastollan, Estane, Morthane, Pellethane, Pearlthane or Texin. These suitable thermoplastic polyurethanes have a molecular weight of at least 10,000 g/mol and comprise a block-like sequence of hard and soft segment starting materials (monomers) in the polymer resin.

In one particularly suitable embodiment, the moulding compositions which form the articles or semi-finished products which are modified according to the invention comprise flexible urethane elastomer formulation components, the soft segment phase of which is predominantly formed from ester soft segment components.

Formulations for moulding compositions which are particularly preferred are those in which the predominant part of the resin component which is used as a thermoplastic urethane elastomer formulation component comprises soft segment ester components Thus the present invention relates in particular to the modification of products and/or semi-finished products made from moulding compositions which exhibit soft, elastic properties and which consist at least of thermoplastically processable polyurethane resins and polyester amide resins. The present invention further relates to the fact that the films according to the invention which are produced from resin mixtures exhibit a degree of biodegradability which is superior to that of prior art films made from thermoplastic polyurethanes.

It is stated by Elias in: Makromolekule, Volume 2, 5th Edition, Huthig und Wepf Heidelberg, 1992, that in polymer mixtures one polymer constitutes a solvent for the other. Polymers are very seldom miscible, since the Gibbs free energy of mixing of polymer mixtures is mostly positive. Therefore, most polymer mixtures exhibit properties observable on a macroscopic scale which differ considerably from the constituent properties of the mixture components of the blend concerned. For the articles to be modified according to the invention which are described here, and which are based on blend formulations, the properties which are observed on a macroscopic scale exhibit an astonishing extent of variation depending on the quantitative proportions of the mixture components, without the occurrence of what are clearly shear-dependent demixing structures. The polymer resins which are mixed for this invention each intrinsically comprise what are already multiphase structures, so that a mutual broadening of the network structures of the components of the mixture has to be assumed for the present invention. For this reason, the mixtures according to the invention can be processed or shaped to form moulding compositions or articles which have properties which do not obviously represent the corresponding constituent properties of the mixed polymer resins which are used.

A particularly surprising effect which has been observed is that thermoplastic polyurethanes and polyester amide copolymers are miscible with each other in a compatible manner in formulations, i.e. the properties of the blend components proportionally correspond to those of the pure raw material components used. In particular, it was not obvious, for example, that the mechanical strength properties of the resin mixtures according to the invention would not fall to values less than the characteristic property values of the raw materials used, as is customary for incompatible plastics. Demixing phenomena such as these are observed, for example, for mixtures of thermoplastic polyurethanes with low density polyethylene resins, for which it is known to the relevant person skilled in the art who is experienced in this field that strength values are observed for this blend which are 10 $N/mm^2$ less than the value for pure polyethylene. Moreover, blends such as these exhibit strongly anisotropic demixing structures, in which the different phases form domains oriented in the direction of processing.

Articles or semi-finished products, particularly films, which are particularly suitable for modification according to the invention, are characterised in that they comprise a proportion of at least 30% by weight of a thermoplastic resin constituent, particularly a copolyester amide constituent, which exhibits good biodegradability, and a proportion of at least 15% by weight of a thermoplastic resin constituent, particularly a polyurethane resin constituent, which exhibits a degree of biodegradability which is less good.

In one suitable embodiment, the moulding composition, which is produced from blends of thermoplastic resins for the production of suitable products which are modified according to the invention, additionally contains customary additives from the group comprising I. anti-seizing agents, inorganic or organic separators, II. internal lubricants or demoulding agents, III. inorganic or organic pigments or fillers, and IV. stabilisers.

These customary additives are described, for example, by Gachter and Muller in Kunststoff-Additive, Carl Hanser Verlag Munich, 3rd Edition (1989).

Inorganic additives which are particularly preferred come from the group comprising V. natural and synthetic hydrated silica or silicates, including layer silicates, VI. titanium dioxide, and VII. calcium carbonate.

The semi-finished products which are preferred according to the invention for the method of modification constitute films made from blends of at least two thermoplastic resins. Before they are modified, the latter preferably have a Shore D hardness less than 55, as measured according to DIN 53505.

The preferred films according to the invention are those which have a total thickness between 20 μm and 500 μm.

A method of modifying plastics articles is suitable in which at least two of the polymer resins used as raw materials for the moulding compositions have previously been subjected to premixing in a softened state in a compounding step.

An embodiment of the method according to the invention is particularly suitable in which the resin mixtures which are used as moulding compositions comprise mixtures of thermoplastic polyurethanes, which have a Shore A hardness less than 95 as measured according to DIN 53 505, with ester amide polymers.

The construction of endless screw devices which are suitable for the digestion of thermoplastic resins is described, for example, by Wortberg, Mahlke and Effen in: Kunststoffe, 84 (1994) 1131–1138, by Pearson in: Mechanics of Polymer Processing, Elsevier Publishers, New York, 1985, by Stevens and Covas in: Extruder Principles and Operation, Chapman & Hall, 2nd Edition, London, 1995, and by the Davis-Standard company in: Paper, Film & Foil Converter 64 (1990), pages 84–90. Devices for shaping the melt to form films are described by Michaeli in: Extrusions-Werkzeuge, Hanser Verlag, Munich 1991, amongst other literature references.

For the modifications to semi-finished products which were made within the scope of the following examples and comparative examples, the films which were processed were produced by blown film extrusion from resin mixtures consisting of thermoplastic polyurethanes, which exhibited poor biodegradability, and of biodegradable thermoplastic ester amide copolymers. Modification according to the invention of the aforementioned semi-finished products was conducted in aqueous solution. The buffer solution, which was maintained at a controlled temperature, was incubated with proteases.

EXAMPLE A

A film for which a pre-manufactured plastics compound was used as a raw material was produced by means of a blown film extrusion die. The plastics compound consisted of 82.5% by weight of an ester amide copolymer resin with a Shore A hardness greater than 95, 15% by weight of a TPU which had a Shore A hardness of 92 and which contained polybutylene adipate soft segments, 1.5% by weight of silicates and 1% by weight of low molecular weight amide waxes.

The extrusion device was operated at temperatures between 130° C. and 170° C. The flow of molten plastics compound was discharged through an annular gap die with a diameter of 110 mm in a blown film head at an operating temperature of 190° C. The annular length of melt was cooled by blowing with air, was cut in its edge regions and was wound up in the form of individual lengths of thickness 50 μm. The finishing operation according to the invention was effected in an aqueous buffer solution for a period of 60 minutes. The buffer solution was maintained at a controlled temperature of 37° C. The pH was 6.5.

EXAMPLE B

A flm of thickness 50 μm was produced analogously to Example A. The raw materials were combined shortly before the inlet of the extruder, wherein the composition of the blend was represented by the following proportions: 29% by weight TPU, 68.5% by weight of ester amide copolymer resin, 1.5% by weight of silicate and 1% by weight of wax. The processing parameters corresponded to those of Example A, except that the extrusion die was operated at temperatures of 130–180° C. only, and the melt temperature was 200° C. The finishing modification according to the invention was effected analogously to Example A.

EXAMPLE C

A film of thickness 50 μm was produced analogously to Example B. The composition of the blend was 58.5% by weight of ester amide copolymer, 39.5% by weight TPU, 1% by weight wax and 1% by weight silicate. The finishing modification according to the invention was effected analogously to Example A.

Comparative Example 1

A TPU film was produced using the parameters cited for Example A. The composition of the translucent film of thickness 50 μm corresponded to 97% by weight of a TPU which had a Shore A hardness of 92 and which comprised a soft segment phase based on polyadipate, as well as 1% by weight of a low molecular weight amide wax and 2% by weight of hydrated silica. The processing parameters corresponded to those of Example B. The modification experiment was performed analogously to Example A.

Comparative Example 2

An ester amide copolymer film of thickness 50 μm was produced using 98% by weight of a copolyester amide with a Shore A hardness greater than 95, 1% by weight silicate and 1% by weight of amide wax. The processing parameters corresponded to those of Example A. The modification experiment was performed analogously to Example A.

The films which were produced in the examples and comparative examples were assessed firstly with regard to their properties which were relevant to the use thereof, such as feel or kindness to the skin, or touch, and secondly with regard to their biodegradability. These relevant properties were assessed by means of subjective evaluations by a plurality of independent persons, and the results of these assessments are given in Table 1. As far as possible, the subjective evaluations were verified by standard test procedures.

Feel was assessed manually on the finished length of film before and after the finishing step. Coefficients of friction were determined according to DIN 53 375. The gloss was determined according to DIN 67530 at an angle of measurement of 20°.

The characteristic properties of the films produced in the context of the examples and comparative examples are given in the Table below.

It can clearly be seen from the Table that the films which were produced in the examples were considerably superior to the films known from the prior art which were produced in the comparative examples, particularly with respect to the controlled biodegradability thereof. Films which had not yet been modified according to the invention exhibited no advantages with regard to wearer comfort and flexibility compared with films which purely comprised ester amide copolymers, such as those described in comparative example 2.

In the case of uninhibited biodegradability (comparative example 2), non-uniform degradation immediately occurred, and proceeded preferentially from the edge inwards. Even after 60 minutes, this process had progressed to such an extent that further characterisation with regard to coefficient of friction and feel was not possible. In the modification experiment on a non-biodegradable semi-finished product, no changes were determined.

TABLE 1

Properties of the films produced in the context of the examples and comparative examples

| Property | Method of determination | Units | Example A | Example B | Example C | Comparative example 1 | Comparative example 2 |
|---|---|---|---|---|---|---|---|
| Biodegradability | see text | /. | delayed, uniform | delayed, uniform | delayed, uniform | no degradation | non-uniform |
| Feel before finishing | see text | /. | pleasant | pleasant | pleasant | pleasantly soft, tended to stick | stiff |
| Feel after finishing | see text | ./. | very smooth and adaptable | very smooth and adaptable | very smooth and adaptable | pleasantly soft, tended to stick | could not be assessed |
| Coefft. of static friction before finishing | DIN 53375 | ./. | 0.39 | 0.34 | 0.35 | 0.61 | 0.25 |
| Coefft. of static friction after finishing | DIN 53375 | ./. | 0.34 | 0.31 | 0.30 | 0.61 | could not be determined |
| Coefft. of sliding friction before finishing | DIN 53375 | ./. | 0.52 | 0.53 | 0.53 | 0.68 | 0.45 |
| Coefft. of sliding friction after finishing | DIN 53375 | ./. | 0.49 | 0.50 | 0.50 | 0.68 | could not be determined |
| 20° gloss before finishing | DIN 67530 | GU* | 3.1 | 4.2 | 3.3 | 3.7 | 2.8 |
| 20° gloss after finishing | DIN 67530 | GU | 0.3 | 0.3 | 0.4 | 3.6 | could not be determined |

*Gardner units

What is claimed is:

1. A method of modifying articles and/or semi-finished products made from polymer resin molding compositions comprising subjecting said articles and/or semi-finished products to biodegradation in accordance with DIN 54 900, said molding compositions containing a mixture of thermoplastic polymers comprising, a first thermoplastic ester amide resin component which is formed from copolymers which contain,
  A) an ester constituent formed from linear and/or cycloaliphatic bifunctional alcohols and from linear and/or cycloaliphatic bifunctional acids, or
  B) an ester constituent formed from acid- and alcohol-functionalized components, or a mixture or a copolymer of A) and B), and
  C) an amide constituent formed from linear and/or cycloaliphatic bifunctional amines and from linear and/or cycloaliphatic bifunctional acids or
  D) an amide constituent formed from acid- and amine-functionalized components,
  or a mixture of C) and D) as an amide constituent, the proportion of ester constituent A) and/or B) being at least 30% by weight with respect to the sum of A), B), C) and D); and a second thermoplastic polymer component which is different than said first thermoplastic ester amide resin component, wherein said second thermoplastic polymer component has a degree of biodegradability which is less than the degree of biodegradability of said first thermoplastic ester amide resin component.

2. The method of claim 1, wherein partial biodegradation is conducted in a buffered aqueous solution maintained at a controlled temperature.

3. The method of claim 1, wherein said articles comprise a proportion of at least 30% by weight of said first thermoplastic ester amide resin component and a proportion of at least 15% by weight of said second thermoplastic polymer component.

4. The method of claim 1, wherein partial biodegradation of the plastics articles is effected by microorganisms or enzymatically in a buffer solution.

5. The method of claim 1, wherein the Shore D hardness of the molding composition before modification, as measured according to DIN 53 505, is less than 55.

6. The method of claim 1, wherein the polymer resins used for the molding compositions have previously been subjected to premixing in a softened state in a compounding step.

7. The method of claim 1, wherein the thermoplastic polyurethane has a Shore A hardness less than 95 as measured according to DIN 53 505.

8. The method of claim 1, wherein the molding compositions additionally contain at least one customary additive selected from the group consisting of I.) anti-seizing agents, inorganic or organic separators, II.) internal lubricants or demolding agents, III.) inorganic or organic pigments or fillers, and IV.) stabilizers.

9. The method of claim 1, wherein the molding compositions contain at least one inorganic additive selected from the group consisting of, V.) natural and synthetic hydrated silica or silicates VI.) titanium dioxide, and VII.) calcium carbonate.

10. The method of claim 1, wherein said second thermoplastic polymer component is a thermoplastic polyurethane.

11. The method of claim 1, wherein the bifunctional alcohols of A) are selected from ethylene glycol, hexanediol, butanediol, and cyclohexanedimethanol, the bifunctional acids of A) are selected from succinic acid, adipic acid and cyclohexanedicarboxylic acid, the acid- and alcohol-functionalized components of B) are selected from hydroxybutyric acid and hydroxyvaleric acid, the bifunctional amines of C) are selected from isophorone-diamine, the bifunctional acids of C) are selected from succinic acid and adipic acid, and the acid- and amine-functionalized components of D) are selected from ω-laurolactam and ε-caprolactam.

* * * * *